UNITED STATES PATENT OFFICE.

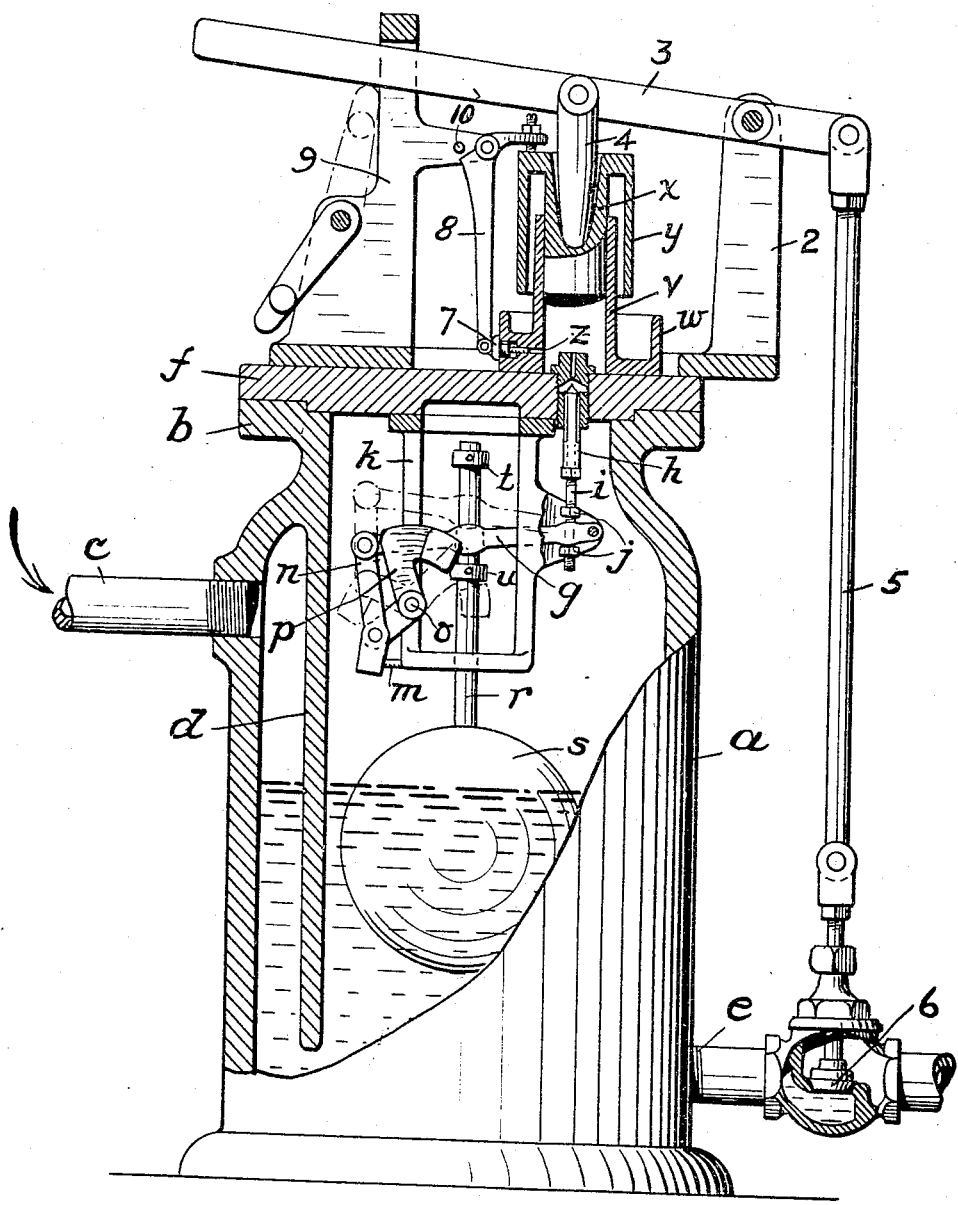

LOUIS R. MERTENS, OF PHILADELPHIA, PENNSYLVANIA, ASSIGNOR TO CHARLES J. MILLER, OF PHILADELPHIA, PENNSYLVANIA.

STEAM-TRAP.

1,285,772.  Specification of Letters Patent.  Patented Nov. 26, 1918.

Application filed October 20, 1917. Serial No. 197,571.

*To all whom it may concern:*

Be it known that I, LOUIS R. MERTENS, a citizen of the United States, residing at Philadelphia, county of Philadelphia, and State of Pennsylvania, have invented a new and useful Improvement in Steam-Traps, of which the following is a full, clear, and exact description, reference being had to the accompanying drawings, which form a part of this specification.

My invention relates to that type of trap designed for the purpose of collecting the condensation of high and low pressure exhaust mains or other high or low pressure drains. The invention has the known mode of operation, wherein, when the condensate in the trap reaches a predetermined level, the trap clears itself, and when the trap is substantially cleared the discharge closes until the water again reaches a given height. Such traps, however, usually comprise a steam valve which is opened by a float, when the latter reaches a given height, to admit steam from the trap chamber to a cylinder, thereby operating a piston which, through appropriate connections, opens the water discharge valve. Under normal conditions the operation of the best type of such traps may be satisfactory; but abnormal conditions more or less frequently arise that render the trap temporarily inoperative. Thus, a sudden inflow of water into the trap beyond the capacity of the discharge to carry off will fill the trap, cause water to escape through the open steam valve and flood the entire apparatus. The present invention is designed and adapted to overcome this and other objections to known traps.

One of the novel features of my improved trap is the provision of an ordinary unbalanced water discharge valve which the pressure of water in the tank tends to open but which is held closed by steam pressure. Another novel feature is the provision of a normally open steam valve which allows the steam pressure to normally act upon the water discharge valve to close it and which is closed when the water in the trap reaches a given level, provision being made to then relieve the steam pressure to permit the water discharge valve to operate. With such a construction, there is no possibility of flooding the apparatus, because the steam valve closes when the water reaches a given height and remains closed until the water level drops below that height, so that a temporary excessive inflow of water will necessarily back up in the supply pipe. Other features of novelty will be disclosed in the detailed description of the trap, a preferred form of which is shown in the drawings in which the figure is a front view of the trap largely in section.

A casing *a* of cylindrical form is provided with a flange *b*. Near the top of the casing is an inlet pipe *c* having opposite to it a deflector *d* extending downward to near the bottom of the casing. Near the bottom on the opposite side of the casing is a water discharge pipe *e*. A cover *f* having a flange is suitably fastened to the casing. Extending through the cover is a needle valve *h* whose adjustable stem *i* has threaded thereon spaced-apart nuts *j*.

Fastened to the under side of the cover *f* is a hanger *k*. One end of a lever *g* is pivoted to the hanger. Near its pivoted end the lever *g* extends between the nuts *j* in operative relation therewith. To the other end of lever *g* is pivoted the upper end of a link *n*. Below the lever *g* and pivoted to the opposite side of the hanger at *o* is a weighted lever *p*. The lighter end of the lever *p* is pivoted near the lower end of the link *n*. The extreme lower end of lever *n* is in operative relation with a stop *m* on the hanger.

The lever *g* and the cross-member of the hanger are provided with holes through which the stem *r* of the valve float *s* extends. On the stem *r* are adjustably fastened the stops *t* and *u*, which limit the up and down movements of the float.

To the cover *f* is fastened a cylinder *v* centered over the needle valve *h*. The cylinder has a trough-shaped base formed by the annular flange *w*. Within the cylinder is a piston *x*, the head of which extends beyond the outer wall of the cylinder and from which the annular flange *v* extends downward below the top of the flange *w* when in its lower position. The base of the trough, at one point in its circumference, is thickened and through this thick part of the base is formed a steam or vapor escape aperture *z*. To the top of the casing is fastened a bracket 2, to which is pivoted, near one end, a lever 3. To the long end of the lever is attached a link 4 having a socket bearing in the piston $x$. The shorter end of the lever 3 is connected, through a rod 5, with the stem of a water discharge valve 6, in the discharge pipe $e$.

The steam valve control mechanism, namely: the parts $g$, $n$ and $p$, is so counterbalanced that it has a dead center between its two extreme positions and hence remains in either of those positions until positively shifted toward the opposite position. When said mechanism is moved to one side or the other of its dead center it completes its own movement in that direction so that the operation of the valve is much quicker than it would be if its actuating mechanism were moved, throughout its entire range of movement, by the float. Friction, however, may more or less limit the extent of the automatic movement; but regardless of the extent to which its automatic movement is thereby effected, it is evident that once the valve control mechanism is moved into position to either open or close the needle valve, the valve will remain in that position until the float again actuates the valve control mechanism.

In actual operation, the inlet pipe $c$ leads from a steam exhaust main or drain. Steam and water of condensation from this pipe strike the deflector $d$ and collect at the bottom of this casing. The valve control mechanism is in the position shown in full lines and the steam valve $h$ is held open. As soon, therefore, as steam enters the trap, it is admitted to cylinder $v$ and lifts piston $x$, closing the discharge valve against the pressure of water tending to open it.

As the level of the water in the trap rises, the float $s$ rises, raising the stem $r$. When the water approaches the level at which it is predetermined to clear the trap, the stop $u$ contacts with the lever $g$ and moves the valve control mechanism beyond its dead center, whereupon its movement is automatically completed (the parts moving to the dotted line position), and the needle valve closes. The steam in cylinder $v$ escapes through the vent $z$ and what does not escape starts to condense and lose its volume, so that upward pressure upon the piston is immediately relieved. The valve 6 immediately opens under the pressure of water in the pipe $e$ and the water is blown out of the trap.

As the water level lowers, the float sinks and the stop $u$ leaves the lever $l$, while the stop $t$ approaches it. The valve, however, is held closed by its control mechanism until the latter is actuated by stop $t$ and is thereby moved toward the position shown in full lines. The latter part of this movement is effected automatically, as hereinbefore described, and the needle valve is fully opened.

Steam now again enters the cylinder $v$ and lifts the piston $x$, which returns the discharge valve 6 to closed position. This completes the cycle of operations.

It will be understood that without any throttling of the steam vent $z$, water vapor will escape constantly or intermittently through the vent during the time that the trap is filling. This is not particularly objectionable. However, it is preferred to throttle this vent, or practically close it, during this part of the operation. This is effected by means of a stopper 7, which is secured to one end of a bell-crank lever 8, the other end being upheld by the piston $x$. The bell crank is pivoted on a bracket 9. As long, therefore, as the valve $h$ is held open, the vent $z$ is closed; but when the valve $h$ is closed and the steam confined in the cylinder starts to condense, a very slight lowering of this piston $x$ frees the bell crank 8, and the steam in the vent $z$ displaces the stopper 7, the bell crank 8 swinging out until it contacts with the stop 10 on the bracket 9. When the valve $h$ is again opened the lifting of the piston $x$ swings the bell crank 8 into position to cause the stopper 7 to again close the vent $z$.

Having now fully described my invention, what I desire to claim and protect by Letters Patent is:

1. In a steam trap, the combination with a tank having an inlet and an outlet, of a discharge valve controlling the outlet, a cylinder, a steam valve controlling the admission of steam from the tank to the cylinder, a piston in the cylinder, connections from the piston to the discharge valve adapted, when the piston is steam-actuated, to be operated to close the discharge valve, valve-control mechanism connected with the steam valve and adapted in opposite positions to hold the valve respectively open and closed, and a float in the tank movable independently of the valve-control mechanism throughout the greater part of its movement up or down but adapted, as it approaches its upper and lower limits of movement, to move the valve-control mechanism away from its valve-opening and valve-closing positions respectively.

2. A steam trap comprising a tank having an inlet and an outlet, a discharge valve controlling the outlet, a cylinder, a piston in the cylinder, a steam valve adapted when open to supply steam to the cylinder at one side of the piston, a vent in the cylinder on the same side of said piston, a float in the tank adapted to control the operation of the steam valve, and means controlled by the piston to throttle said vent.

3. A steam trap comprising a tank having an inlet and an outlet, a discharge valve controlling the outlet, a cylinder, a piston in the cylinder, a steam valve adapted when open to supply steam to the cylinder at one side of the piston, a vent in the cylinder at the same side of said piston, a float in the tank adapted to control the operation of the steam valve, a pivoted lever, and a stopper for said vent carried by said lever, said piston adapted, when actuated by steam admitted to the cylinder, to operate said lever to cause said stopper to throttle said vent.

In testimony of which invention, I have hereunto set my hand, at Philadelphia, Pa., on this 18th day of October, 1917.

LOUIS R. MERTENS.